Sept. 9, 1952   W. H. CLARK   2,609,761
CARGO SECURING MEANS
Filed March 6, 1948
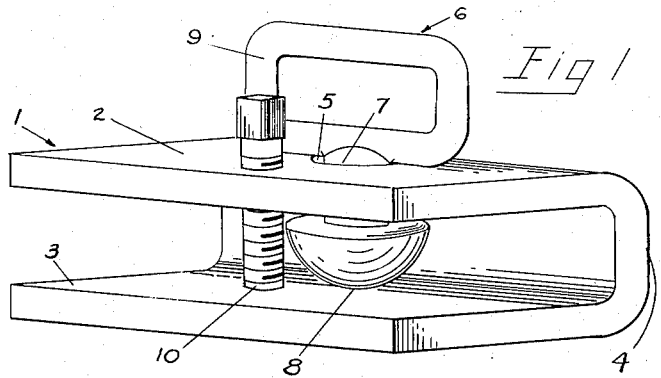
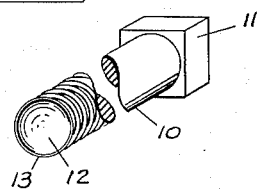
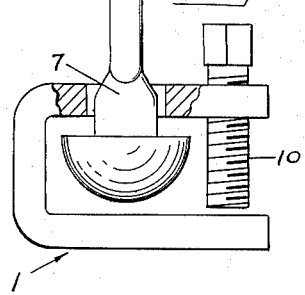
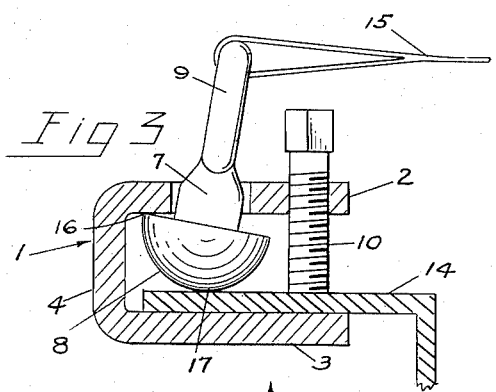
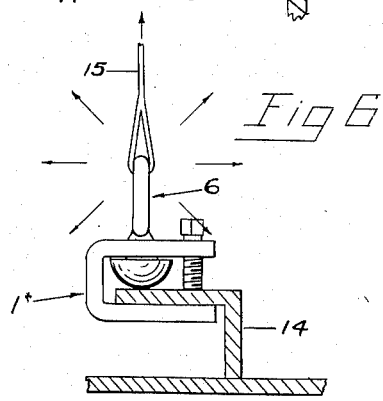
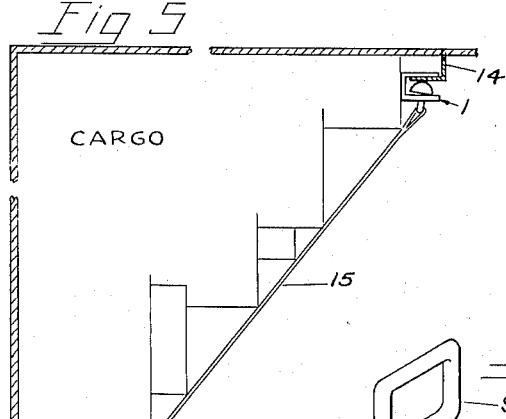
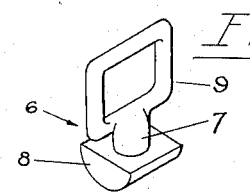
INVENTOR.
WILLIAM H. CLARK
BY
Boyken, Mohler & Beckley
ATTORNEYS Patented Sept. 9, 1952

2,609,761

UNITED STATES PATENT OFFICE 2,609,761

CARGO SECURING MEANS

William H. Clark, San Mateo, Calif.

Application March 6, 1948, Serial No. 13,401

8 Claims. (Cl. 105—369)

This invention relates to a clamp and more particularly to a clamp which may be used for stowing cargo in the hold of a ship, vehicle, aircraft or conveyance, in which motion or shifting of the same is undesirable.

The invention set forth herein will be seen to have many uses, but its advantages may best be described in connection with ships wherein large amounts of cargo must be stowed securely in place to prevent damage thereto caused by rolling and pitching of the ship. Normally the loading of a ship is accomplished by stowing related cargo together in such a way that certain sections of it destined for particular ports may be removed without disturbing the remaining cargo. Because of this, the hold of a ship may well be only partially loaded between ports, particularly if the particular ship is operating in coastwise or foreign trade, taking on and discharging cargo at each point.

In order to prevent the unnecessary shifting of cargo under these circumstances it has normally been the practice to shore individual sections of cargo with wooden shoring which must, of course, be put up, taken down and replaced frequently, a process both expensive and time consuming. Further, this means of securing cargo is not as safe as is desired, as in heavy seas the shoring may give way with possible damage to cargo, ship and personnel.

The present invention has been designed to eliminate the necessity for use of much or all of the shoring and dunnage normally required. It comprises, in general, the use of special clamps which may be secured to the ribs or beams of the ship's sides, bulkheads, decks and overheads between which a tension strap, surrounding and securing the cargo, is strung. The clamps are so arranged that the greater the tension in the strap, as when the same is increased by a shifting of the cargo, the greater is the clamping force adapted to secure the clamps to the ribs or beams.

Thus, an object of the invention is an improved means of securing cargo.

Another object of the invention is a means of securing cargo which comprises the use of tension straps surrounding the cargo, the ends of which straps are secured to the beams of the vehicle.

A further object of the invention is a specially designed clamp for securing cargo arranged so that it tends to grip tighter as the force urging its removal increases.

A still further object of the invention is a clamp for securing cargo having a pair of opposed legs adapted to fit over a beam or rib and which is provided with a wedging mechanism for keeping it in place.

As will be seen more fully, the present invention has various uses, all of which will be obvious to those skilled in the art. For purposes of illustration, however, the invention will be described in conjunction with a ship hold, wherein ribs or beams, either angle or I-shaped, are spaced along the sides, bulkheads and overheads. It is to be clearly understood, however, that the form and use shown and described are illustrative only and that the claims are intended to cover other forms and uses. For example, the preferred form might be altered and still be within the terms of the claims, and it also might be used in railroad cars, trucks and other places where cargo is to be secured.

In the drawings, Fig. 1 is a perspective view of the preferred form of the invention.

Fig. 2 is an end elevation of the form shown in Fig. 1, partially in section to show the relative position and size of the shank.

Fig. 3 is a sectional view of the form shown in Fig. 1 when in position on a beam and as tension is applied to the associated strap.

Fig. 4 is a perspective view of the holding bolt showing its construction.

Fig. 5 is an exaggerated plan view of a ship's hold, showing the invention connected between the ship's beams and holding cargo in place.

Fig. 6 is an illustrative view indicating the directions in which tension may be applied to the clamp.

Fig. 7 is a perspective view of an alternative form of clamping member.

As can best be seen in Fig. 1, the clamp, generally designated 1, comprises a pair of legs 2, 3 connected at one of their ends by a web 4. Preferably these members are formed integrally from a single piece of material bent into a U-shape as shown in the drawings. Any suitable type of metal may be used, but high-quality, hardened steel serves very well.

Approximately centrally of one of the legs 2 is drilled a hole, as at 5, extending entirely through the leg. This hole is adapted to receive a clamping member, generally designated 6, comprising a shank 7, a head 8 and a loop member 9. The head 8, positioned on the end of shank 7 adjacent leg 3 is enlarged with respect to the shank and is curved as may be been in the drawings, for a purpose to be described. In the preferred form, the head may be made substantially hemispherical, although the particular curve is not critical. The loop member 9, secured to the other end of the shank and on the opposite side of leg 2 may be rectangular or in other convenient form so that the strap member, to be described, may easily be attached thereto.

The clamping member 6 is also preferably formed of high-quality, hardened steel and its elements may be cast or secured together by welding. As will be noted, the hole, as at 5, is of a diameter considerably larger than that of the shank 7 of the clamping member, so that the latter fits loosely therein. The clamping member, however, may not be removed therefrom because of the larger size of the head 8 and loop member 9. In constructing the unit, the loop member or head may be welded to the shank after it is inserted in the hole in leg 2; or a gate to the hole may be opened in the leg, the clamping member inserted in the hole and the gate rewelded.

An alternative form of clamping member is also shown in Fig. 7. The reference numerals on this form are identical with those in connection with the form shown in the other figures, but it will be seen that the head 8, instead of being hemispherical is formed in the shape of a half cylinder. This form is useful in instances where a greater bearing area is desired.

The clamp may also be provided with a threaded holding bolt 10 adapted to be received in a threaded hole extending through leg 2. This bolt, which is also hardened, is provided with a head 11, adapted to receive a wrench, and its opposite end is hollow centered, as at 12, with an upstanding sharpened circumferential ridge 13, as can best be seen in Fig. 4.

In use, the clamp 1 is placed upon the beam or ribs, designated 14, partially shown in Fig. 3. The clamp is so positioned that the beam lies adjacent leg 3. For convenience in holding the clamp in position until tension is applied, holding bolt 10 may be screwed down forcing the beam 14 against leg 3. The fact that the bolt 10 is hollow centered assists in securing the clamp as the sharpened ridge 13 on its lower end cuts into the beam to insure a secure arrangement. It is to be clearly noted, however, that when bolt 10 is used, its purpose is simply to maintain the clamp in position until tension can be applied and it is not designed to secure the clamp while performing its primary function of holding the cargo against shifting.

The operation of the invention is illustrated in Fig. 5 where two clamps are seen to be attached to a pair of beams 14 on a ship's sides or bulkheads. A tension strap 15 is connected between the clamps, most conveniently by passing it through the loop members 9 of the clamping member 6. The tension strap 15 may, of course, be rope, cable, chain, etc. but is preferably conventional steel strapping which may be crimped up and secured by means of seals in the conventional manner.

Tension on the strap 15 naturally causes the clamping member 6 to assume an inclined position with respect to a perpendicular to leg 2, as can be seen in Fig. 3. In this position, the head of the clamping member is in engagement with the leg 2 at point 16 and in engagement with the beam at point 17. As tension is applied to strap 15, the head 8 is forced against the beam 14 in lever fashion about the fulcrum point 16. The greater the tension applied to the strap, the greater will be the forces which the head exerts against beam 14 and the latter against leg 3. It is thus seen that as tension increases, the clamp will grip the beam tighter and tighter and may not be removed until the tension in the strap is removed.

Because the head 8 is substantially hemispherical, this lever action, forcing the head against the beam and the latter against the opposite leg of the clamp, will occur regardless of the direction which the strap 15 pulls; except, of course, in the rather unusual case when the pull happens to be exactly normal to the clamped beam, in which case the head is held lightly against said beam. Obviously the preferable position of the clamp is shown in the lower end of Fig. 5 where the tension on the strap tends to pull the clamp further onto the beam, but equally satisfactory operation is possible regardless of the direction of pull exerted by the strap, as is illustrated in the upper clamp of Fig. 5. For example, Fig. 6 is intended to illustrate that the clamp will operate in the position shown even though the strap may extend and be applying a force in any direction, as is illustrated by the arrows. In any case, the lever action causes the head to be forced against the beam and the beam against the adjacent leg of the clamp and the greater is this force, the tighter will the clamp grip the beam.

It is thus seen that the invention by the use of a few clamps and straps does away with the complicated shoring problem in whole or in part. In use, in coastwise traffic, it has been found that the invention, at a small cost, eliminates approximately one-half of the cost of materials and labor in shoring and reshoring at ports of call. It is, of course, extremely simple to install, requires no attention and is exceedingly strong and safe.

As illustrative of the operation of the invention, a clamp of the design shown in Fig. 1, and having legs measuring approximately 3½" x 6" of ½" steel, provided with a clamping member with a shank and head approximately 1" and 2" in diameter, respectively, will remain securely in position under forces of 10,000 pounds exerted by the steel strap measuring approximately ⅛" by 2". Obviously, units of other sizes may be used to operate under other forces.

The term "vehicle," as used in the claims, is intended to be a general term referring to any storage space wherein cargo is to be secured against movement.

I claim:

1. An anchor for a cargo-bracing strap comprising; a generally U-shaped member providing a pair of spaced opposed legs, a clamping element on one leg of said pair having an enlarged head wholly disposed between said legs, said legs being free from each other along three sides thereof and said head being spaced from the other leg of said pair for positioning a flange of a vehicle framing member between said other leg and said head with said flange projecting from said three sides and for clamping said flange between said head and said other leg upon tilting said head to one side, an opening formed in said one leg, a shank rigid with said head swingably extending through said opening perpendicularly to said one leg and for swinging in opposite directions, said shank projecting outwardly from the side of said one leg that is opposite to said head for so tilting said head upon so swinging the projecting end of said shank and said projecting end of said shank being adapted to receive one end of a cargo-bracing strap.

2. An anchor for a cargo-bracing strap comprising; a generally U-shaped member providing a pair of spaced, opposed legs having flat, opposed, substantially parallel surfaces respectively of a similar breadth and length, a clamping element on one leg of said pair having a head disposed between said surfaces, said legs being free from each other along three sides thereof and said head being spaced from the other leg of said pair for positioning a flange of a vehicle framing member between said other leg and said head with said flange projecting from said free sides and for clamping said flange between said head and said other leg upon tilting said head to one side, a shank rigid with said head swingingly extending through said one leg for swinging oppositely from a position extending perpendicularly to said one leg, said shank projecting outwardly from the side of said one leg that is opposite to said head for so tilting said head upon so swinging the projecting end of said shank, said one leg being formed with a circular opening through which said shank extends and said head being substantially larger than said shank and larger than the diameter of said opening radially of the axis of the latter, the side of said head directed toward said other leg being convexly rounded, said shank and said head being rotatable relative to said one leg about the axis of said shank and the end of said shank projecting from said one side of said one leg being adapted to receive one end of a cargo-bracing strap.

3. An anchor for a cargo-bracing strap comprising; a generally U-shaped member providing a pair of spaced, opposed legs; a clamping element on one leg of said pair having a head disposed between said legs, said legs being free from each other along three sides thereof and said head being spaced from the other leg of said pair for positioning a flange of a vehicle framing member between said other leg and head with said flange projecting from said three sides and for clamping said flange between said head and said other leg upon tilting said head to one side, a shank rigid with said head swingably extending through said one leg and projecting outwardly from the side thereof opposite said head for so tilting said head upon swinging the projecting end of said shank and said projecting end being adapted to receive one end of a cargo-bracing strip, the side of said head facing said other leg being generally hemispherical and said shank being swingable relative to said one leg in any direction to permit tilting said head to any side.

4. An anchor for a cargo-bracing strap comprising; a generally U-shaped member providing a pair of spaced, opposed legs; a clamping element on one leg of said pair having a head disposed between said legs, said legs being free from each other along three sides thereof and said head being spaced from the other leg of said pair for positioning a flange of a vehicle framing member between said other leg and head with said flange projecting from said three sides and for clamping said flange between said head and said other leg upon tilting said head to one side, a shank rigid with said head swingably extending through said one leg and projecting outwardly from the side thereof opposite said head for so tilting said head upon swinging the projecting end of said shank, and said projecting end being adapted to receive one end of a cargo-bracing strip, an auxiliary clamping element movably carried by said member for releasably clamping said flange to said other leg.

5. An anchor for a cargo-bracing strap comprising; a generally U-shaped member providing a pair of spaced opposed legs, a clamping element having a head disposed between said legs, a shank rigid with said head and rotatably extending relatively loosely transversely through one leg of said pair and projecting outwardly of said one leg and the projecting end of said shank being adapted to receive one end of a cargo-bracing strap, said head being relatively loose between said legs for movement away from the other leg of said pair to permit passage of a flange of a vehicle framing member to a position between said head and the other leg of said pair and said legs being free from each other along all three sides except at the closed end of the U to permit said passage of said flange to a position between said head and said other leg with said flange projecting from all three sides for clamping such flange between said head and said other leg upon swinging the projecting end of said shank to one side under tension from said strap when the latter is secured to said projecting end, said head being enlarged relative to said shank for simultaneously engaging said one leg and said flange when said projecting end is so swung.

6. An anchor for a cargo-bracing strap comprising; a generally U-shaped member providing a pair of spaced opposed legs, a clamping element having a head disposed between said legs, a shank rigid with said head and rotatably extending relatively loosely transversely through one leg of said pair for swinging to one side and projecting outwardly of said one leg, said head being relatively loose between said legs for movement away from the other leg of said pair to permit passage of a flange of a vehicle framing member to a position between said head and the other leg of said pair and said legs being free from each other along all three sides except at the closed end of the U to permit said passage of said flange to a position between said head and said other leg with said flange projecting from all three sides for clamping such flange between said head and said other leg upon swinging the projecting end of said shank to one side; said head being enlarged relative to said shank for simultaneously engaging said one leg and said plate or strip when said projecting end is so swung; the projecting end of said shank being formed to provide a loop for receiving one end of a cargo-bracing strap, and said shank being swingable to any side to enable swinging said loop to any side for clamping said flange between said head and said one leg when said loop is swung to any side.

7. A clamp of the character described comprising; a pair or spaced opposed legs connected together at one of their corresponding ends, but otherwise free from each other to permit passage of a flange of a vehicle framing member to a position between said legs projecting from the unconnected sides of said legs; a clamping element having an enlarged head disposed between said legs and having a shank swingably extending transversely through one leg of said pair and projecting therefrom with the projecting end being adapted to receive one end of a cargo-bracing strap, said head being spaced from the other leg of said pair a sufficient distance to permit said passage of said flange to between said head and said other leg; said head being generally hemispherical and coaxial with said shank with its curved side facing toward said other leg to enable clamping such flange between said curved side and said other leg upon tilting said head to any side, said shank being swingable relative to said one leg in any direction for so tilting said head.

8. An anchor for a cargo-bracing strap comprising; a U-shaped member providing a pair of spaced opposed legs, the oppositely facing surfaces of said legs being parallel and of substantially the same breadth and length, one leg of said pair being formed with a circular opening; a clamping element having a straight shank with an enlarged head on one end and an eye on the other end rigid therewith for receiving the end of a cargo-bracing strap, said shank extending relatively loosely through said opening for swinging to any side from a position extending perpendicularly to the plane of the inside surface of said leg; said head being disposed between said leg and being larger than the diameter of said opening and movable toward said one leg axially of said shank a sufficient distance to position a flange of a vehicle framing member between said head and the other leg of said pair; said legs of said member being unobstructed for insertion of said flange between said head and said other leg in a direction parallel with the planes of said surfaces from any side except the closed end of said U.

WILLIAM H. CLARK.

REFERENCES CITED

The following references are of record in the file of this patent:

UNITED STATES PATENTS

| Number | Name | Date |
|---|---|---|
| 350,980 | Jurick | Oct. 19, 1886 |
| 761,282 | Aires | May 31, 1904 |
| 1,575,872 | Strohl | Mar. 9, 1926 |
| 1,669,578 | Sherer | May 15, 1928 |
| 1,739,893 | Fedderman | Dec. 17, 1929 |
| 2,170,913 | Rowe | Aug. 29, 1939 |
| 2,226,373 | Frear | Dec. 24, 1940 |